United States Patent
Kawakami et al.

(10) Patent No.: US 10,888,989 B2
(45) Date of Patent: Jan. 12, 2021

(54) ELECTRICAL DEVICE

(71) Applicant: MAKITA CORPORATION, Anjo (JP)

(72) Inventors: Takahiro Kawakami, Anjo (JP); Shoichi Ishikawa, Anjo (JP)

(73) Assignee: MAKITA CORPORATION, Anjo (JP)

( * ) Notice: Subject to any disclaimer, the term of this patent is extended or adjusted under 35 U.S.C. 154(b) by 181 days.

(21) Appl. No.: 15/950,687

(22) Filed: Apr. 11, 2018

(65) Prior Publication Data

US 2018/0304454 A1 Oct. 25, 2018

(30) Foreign Application Priority Data

Apr. 24, 2017 (JP) ................... 2017-085212

(51) Int. Cl.
| | | |
|---|---|---|
| *B25F 5/02* | (2006.01) | |
| *B24B 23/02* | (2006.01) | |
| *H01M 2/10* | (2006.01) | |
| *B23Q 11/08* | (2006.01) | |

(52) U.S. Cl.
CPC .............. *B25F 5/02* (2013.01); *B23Q 11/08* (2013.01); *B24B 23/028* (2013.01); *H01M 2/1022* (2013.01); *H01M 2220/30* (2013.01)

(58) Field of Classification Search
CPC ......... B25F 5/02; B23Q 11/08; B24B 23/028; H01M 2/1022; H01M 2220/30
USPC ....................................................... 173/171
See application file for complete search history.

(56) References Cited

U.S. PATENT DOCUMENTS

| | | | | |
|---|---|---|---|---|
| D106,423 S | * | 10/1937 | Brodeen ................. | D13/119 |
| 7,108,079 B2 | * | 9/2006 | Sakai ................. | B25B 21/02 |
| | | | | 173/122 |
| 10,688,644 B2 | * | 6/2020 | Iida ................. | B23B 49/003 |
| 2004/0111933 A1 | * | 6/2004 | Yoshimizu ......... | G09F 23/0058 |
| | | | | 40/299.01 |
| 2008/0032190 A1 | * | 2/2008 | Furuta ................. | B25F 5/02 |
| | | | | 429/163 |
| 2008/0036420 A1 | * | 2/2008 | Zeiler ................. | H02J 7/0027 |
| | | | | 320/107 |
| 2012/0061117 A1 | * | 3/2012 | Nagasaka ........... | H01M 2/1022 |
| | | | | 173/217 |
| 2012/0085560 A1 | * | 4/2012 | Kuroyanagi ............. | B25F 5/02 |
| | | | | 173/46 |
| 2014/0097217 A1 | * | 4/2014 | Walsh ................. | A45F 5/021 |
| | | | | 224/268 |

(Continued)

FOREIGN PATENT DOCUMENTS

| | | |
|---|---|---|
| JP | 2008-36753 A | 2/2008 |
| JP | 2014-148020 A | 8/2014 |

(Continued)

OTHER PUBLICATIONS

Sep. 14, 2020 Office Action issued in Japanese Patent Application No. 2017-085212.

*Primary Examiner* — Thanh K Truong
*Assistant Examiner* — Katie L Gerth
(74) *Attorney, Agent, or Firm* — Oliff PLC

(57) ABSTRACT

An electrical power tool configured such that two battery packs as a power source are attached thereto may include overhanging elements respectively laterally positioned along lateral sides of the battery packs.

15 Claims, 5 Drawing Sheets

(56) References Cited

U.S. PATENT DOCUMENTS

| | | | | |
|---|---|---|---|---|
| 2015/0328763 A1* | 11/2015 | Ito | ............................ | H02J 7/00 451/359 |
| 2015/0328764 A1* | 11/2015 | Yoshikane | ................ | B25F 5/02 173/104 |
| 2018/0126534 A1* | 5/2018 | Iida | ........................ | B25F 5/02 |

FOREIGN PATENT DOCUMENTS

| | | | | |
|---|---|---|---|---|
| JP | 2016-165783 A | | 9/2016 | |
| WO | WO-2013150849 A1 * | | 10/2013 | ........... F04D 25/105 |

* cited by examiner

ELECTRICAL DEVICE

BACKGROUND

The present disclosure relates to electrical devices. More particularly, the present disclosure relates to hand-held electrical devices including electrical power tools (e.g., a battery-powered disk grinder) and electrical instruments (e.g., a cordless cleaner).

A disk grinder, one of hand-held electrical devices (hand-held electrical power tools), generally includes a tool main body, a gear head attached to a front portion of the tool main body, and a circular grinding wheel (tip tool). The tool main body is made up of a cylindrical motor housing that serves as a handgrip and an electric motor that is contained in the motor housing and used as a drive source. The gear head has a spindle that is rotatably attached to the gear head. The spindle is rotatably connected to a motor-axis of the electric motor via a bevel gear train so as to revolve about an axis perpendicular to the motor-axis. The grinding wheel is attached to a distal end of the spindle. The disk grinder is powered by an AC power source or a DC power source (battery pack).

Such a disk grinder is taught by, for example, Japanese Laid-Open Patent Publication No. 2014-148020 (JP2014-148020A). The disk grinder is a type that is powered by the DC power source. Further, the disk grinder is constructed to have two battery packs as the DC power source. Therefore, the disk grinder can be driven by a rated voltage of, for example, 36V (18V×18V) supplied from the two battery packs. Thus, the disk grinder may function as a high-power disk grinder.

However, the disk grinder taught by JP2014-148020A is constructed such that the two battery packs are attached to a rear portion of the tool main body in a juxtaposed position. As a result, the rear portion of the tool main body may be relatively increased in weight. Therefore, when a user inadvertently drops the disk grinder on a floor, the battery packs may collide against a floor surface, so as to be subjected to a high impact.

Thus, there is a need in the art for improved electrical devices (electrical power tools and electrical instruments).

BRIEF SUMMARY

In one aspect of the present disclosure, an electrical power tool configured such that two battery packs as a power source are attached thereto may include overhanging elements respectively laterally positioned along lateral sides of the battery packs.

According to this aspect, the battery packs attached to the electrical power tool may be protected by the overhanging elements. Further, due to the overhanging elements, the electrical power tool may be horizontally put on a working bench in a highly stable condition.

The electrical power tool may preferably include a tool main body that contains an electric motor used as a drive source, an output member by which a tip tool is attached to a front portion of the tool main body, a battery attachment member by which the battery packs are attached to a rear portion of the tool main body, and the battery packs attached to the tool main body in order to supply electrical power thereto. The overhanging elements may be attached to the battery attachment member.

Other objects, features and advantages of the present disclosure will be readily understood after reading the following detailed description together with the accompanying drawings and the claims.

DETAILED DESCRIPTION

Figure 1:
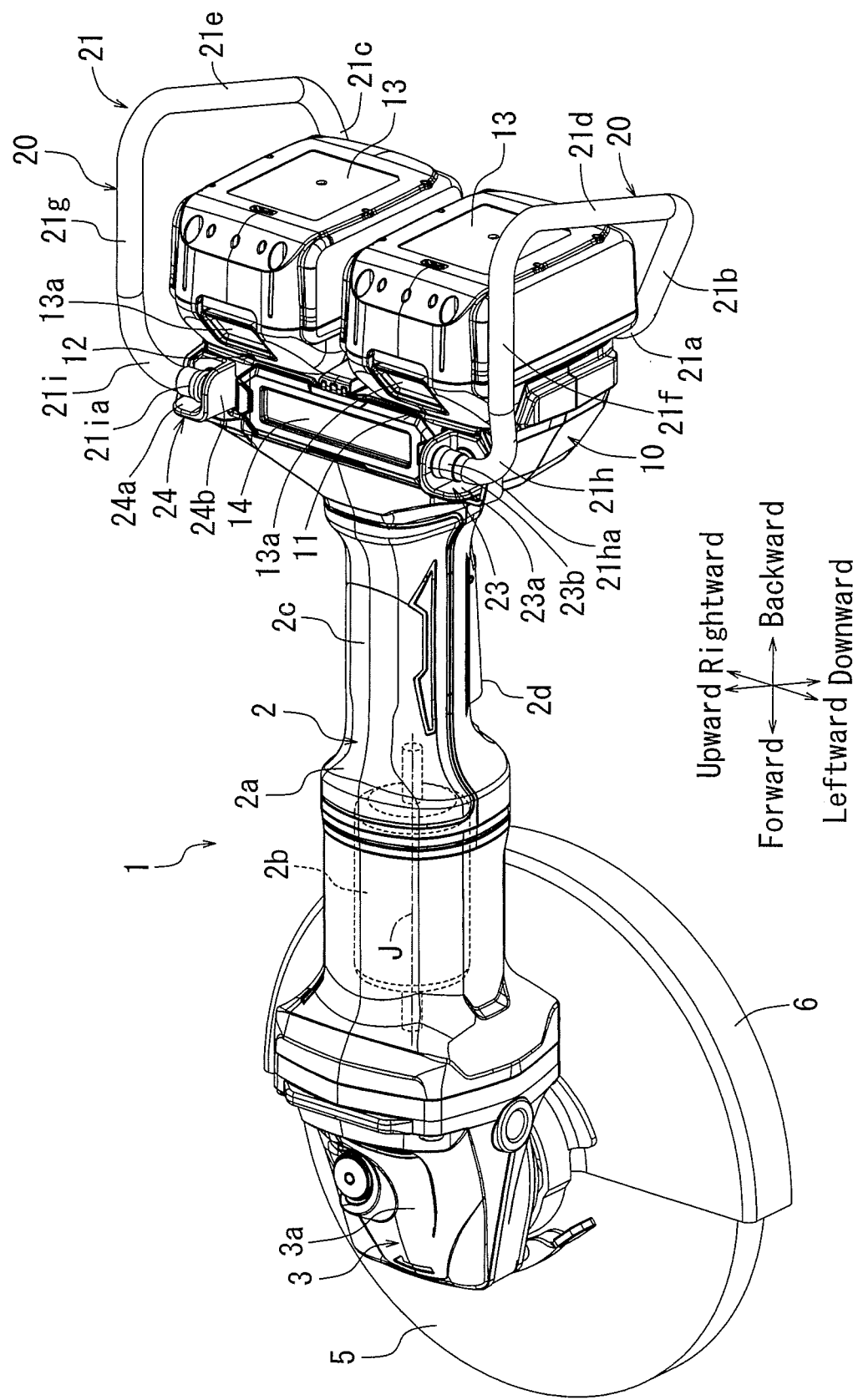
FIG. 1 is a perspective view of a disk grinder according to a representative embodiment of the present disclosure.

A detailed representative embodiment of the present disclosure will be described with reference FIGS. 1 to 5. In the embodiment, a battery-powered disk grinder 1 (which will be simply referred to as a disk grinder 1) may be exemplified as a hand-held electrical device.

Further, forward and rearward, rightward and leftward, and upward and downward in the drawings respectively correspond to forward and rearward, rightward and leftward, and upward and downward of the disk grinder 1.

As shown in FIG. 1, the disk grinder 1 may generally include a substantially columnar tool main body 2, an output member 3 attached to a front portion of the tool main body 2, a battery attachment member 10 formed in a rear portion of the tool main body 2, and a circular grinding wheel 5 (tip tool).

The tool main body 2 may have a longitudinally elongated cylindrical motor housing 2a serving as a handgrip and an electric motor 2b used as a drive source. The electric motor 2b may be contained in the motor housing 2a. The electric motor 2b may be positioned such that a horizontal motor-axis J (an output axis of the electric motor 2b) is directed to a longitudinal direction of the tool main body 2. The motor housing 2a may have a grip portion 2c formed in a substantially rear half thereof. The grip portion 2c may have a diameter slightly smaller than a front half of the motor housing 2a such that a user can comfortably grasp the grip portion 2c. Further, the motor housing 2a may have a switch lever 2d that is formed in a lower surface of the grip portion 2c. When the switch lever 2d is pulled up or turned on by the fingers of one hand grasping the grip portion 2c, the electric motor 2b can be activated.

Figure 2:
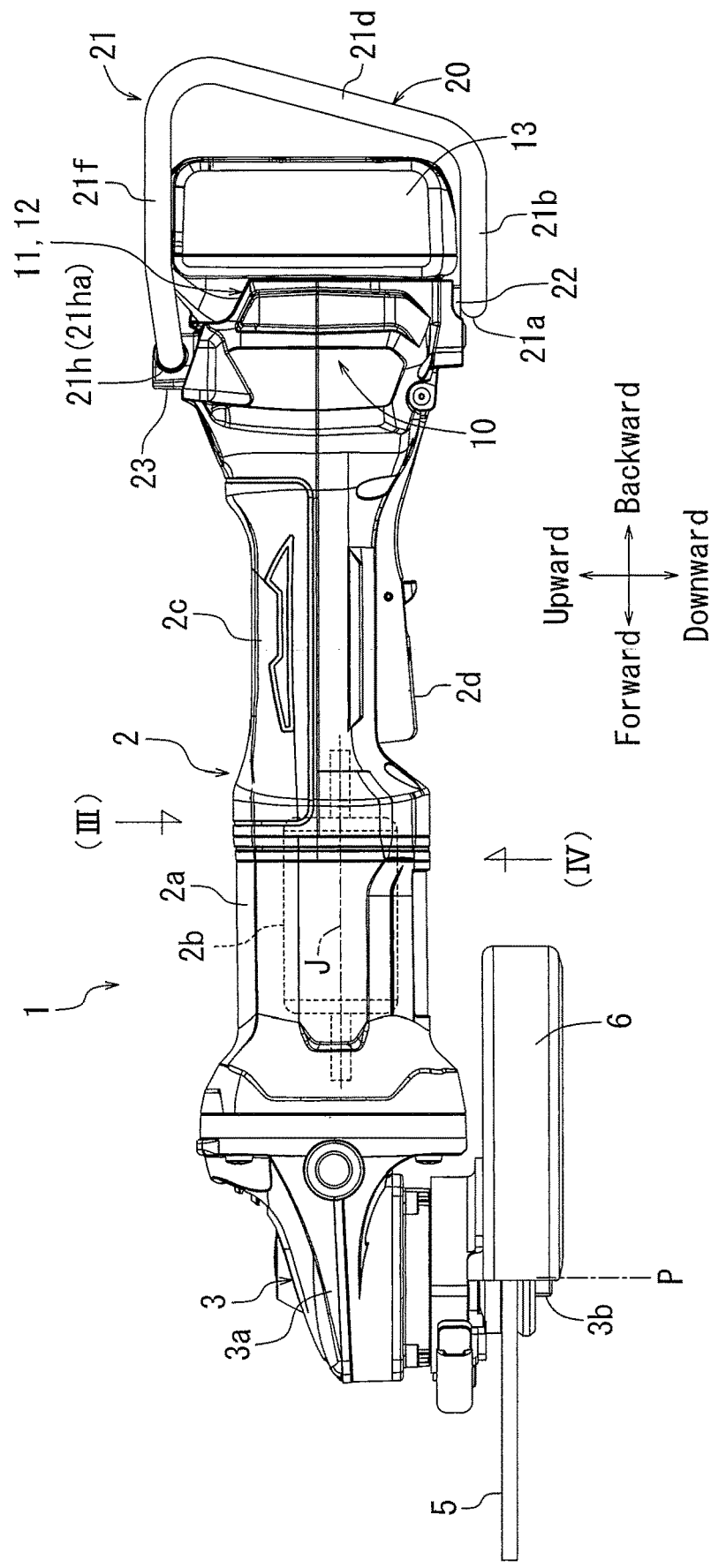
FIG. 2 is a side view of the disk grinder viewed from a left side thereof.

The output member 3 may have a gear housing 3a, a bevel gear train (not shown) contained in the gear housing 3a, and a spindle 3b. The gear housing 3a may be screwed on a front end portion of the motor housing 2a. The spindle 3b may be rotatably attached to the gear housing 3a. Further, the spindle 3b may be rotatably connected to a motor-axis of the electric motor 2b via the bevel gear train, so that output of the electric motor 2b is transmitted to the spindle 3b. As shown in FIG. 2, the spindle 3b may be positioned so as to revolve about a vertical axis or output axis P that is perpendicular to the motor-axis J.

As shown in FIG. 2, the spindle 3b may be positioned such that a lower end portion thereof is projected downward from the gear housing 3a. The grinding wheel 5 is attached to a distal (lower) end of the spindle 3b. When the switch lever 2d is turned on, the electric motor 2b is activated, so that the grinding wheel 5 is rotated via the spindle 3b.

As best shown in FIG. 1, the disk grinder 1 may include a semicircular cover 6 that is attached to the output member 3. The cover 6 may be arranged and constructed to cover a rear half of the grinding wheel 5 except for a lower surface thereof. The cover 6 may effectively prevent powder dust from scattering toward a user of the disk grinder 1.

Figure 3:
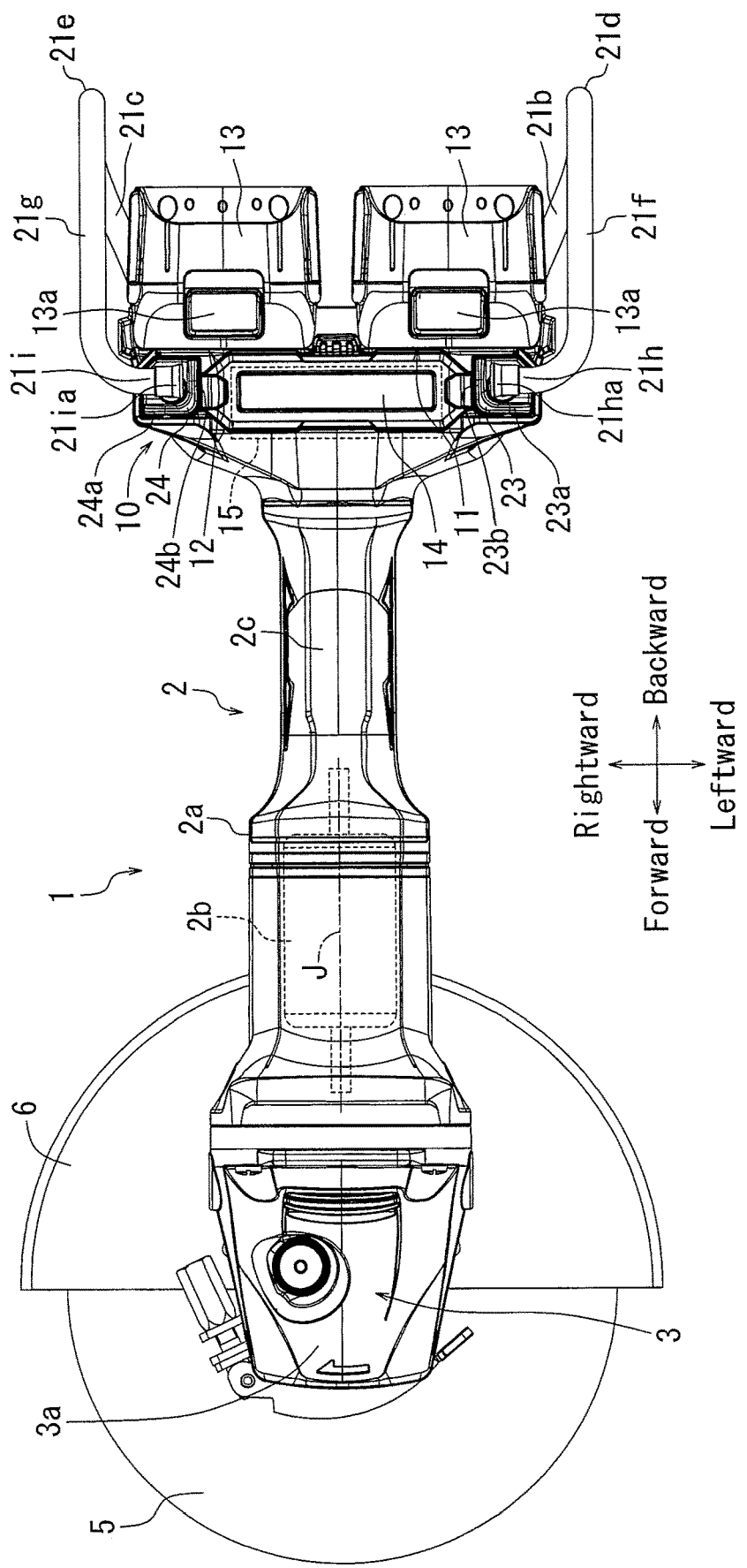
FIG. 3 is a plan view of the disk grinder, i.e., a view viewed from a direction of an allow (III) in FIG. 2.
Figure 4:
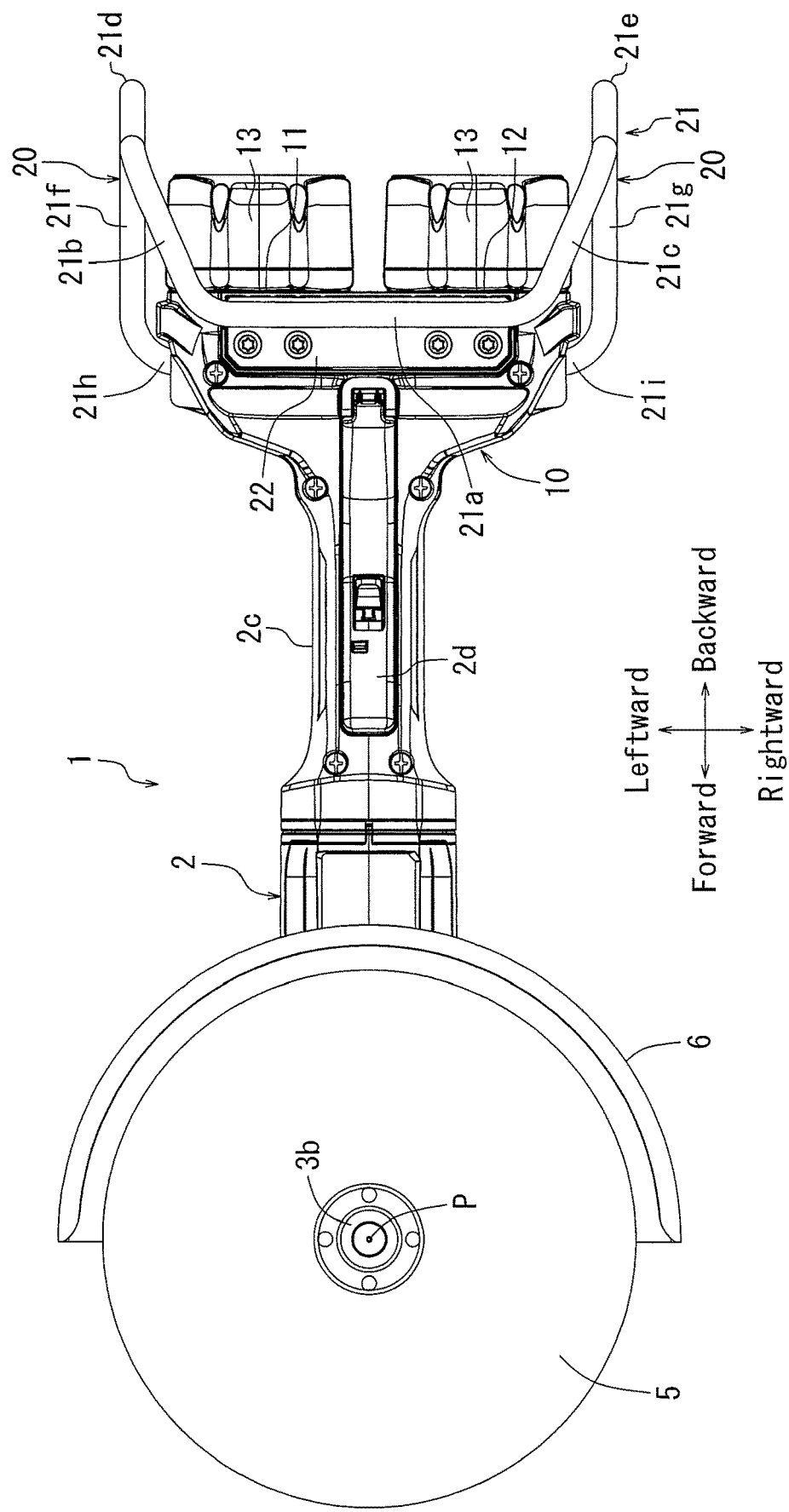
FIG. 4 is a bottom plan view of the disk grinder, i.e., a view viewed from a direction of an allow (IV) in FIG. 2.
Figure 5:
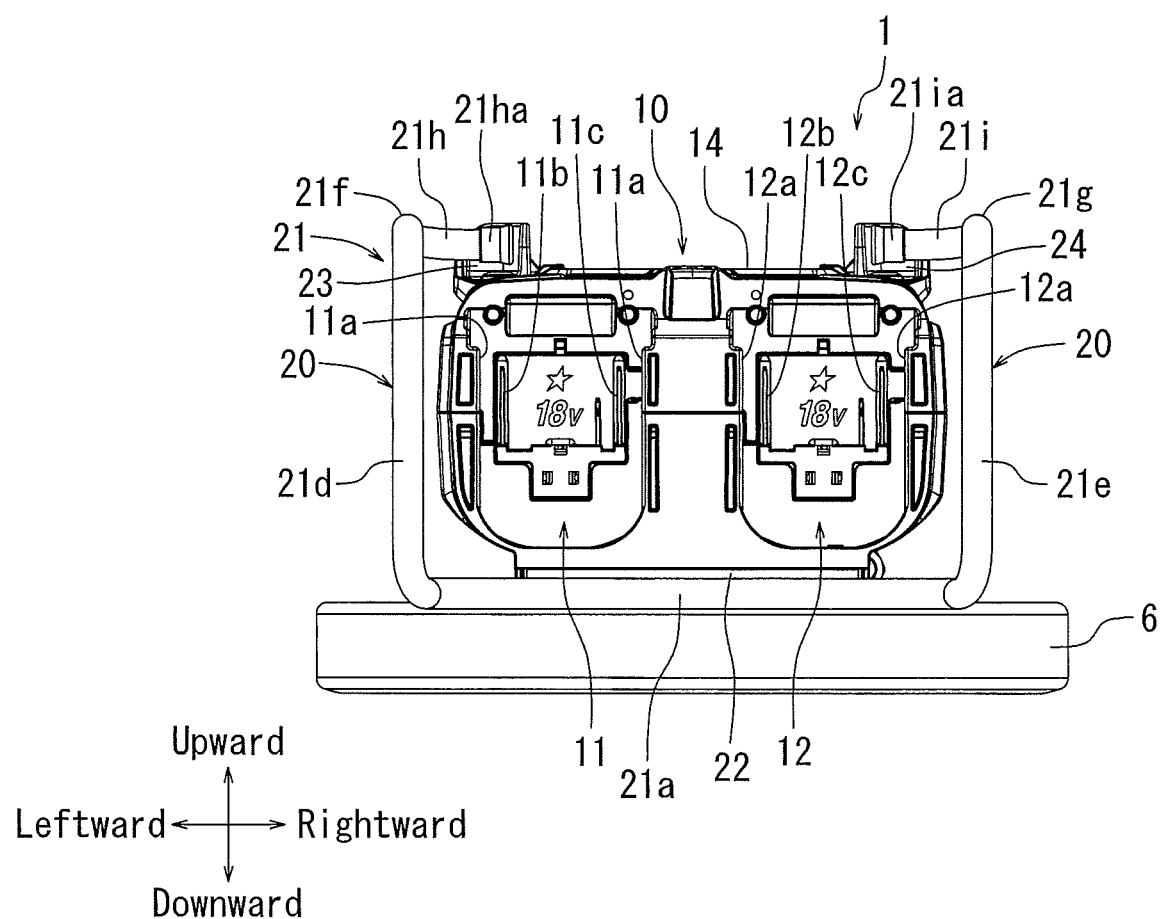
FIG. 5 is a rear view of the disk grinder, which view shows a battery attachment portion from which batteries are removed.

The battery attachment member 10 may have a substantially rectangular plate shape. As shown in FIGS. 3 and 4, the battery attachment member 10 may be configured to be laterally extended or widened relative to the tool main body 2. Further, as shown in FIG. 5, the battery attachment member 10 may have two (left and right) battery attachment portions 11 and 12 that are formed in a rear surface thereof. The battery attachment portions 11 and 12 may be laterally juxtaposed to each other. That is, the battery attachment member 10 may be configured such that two battery packs 13 as a power source are attached thereto while being laterally juxtaposed to each other. The left and right battery attachment portions 11 and 12 may have the same structure as each other. That is, the battery attachment member 10 may be configured such that the two battery packs 13 having an identical structure are respectively attached thereto. The left battery attachment portion 11 may have a pair of (right and left) rail members 11a. Further, the left battery attachment portion 11 may have positive and negative power terminals 11b and 11c that are disposed between the right and left rail members 11a. Similarly, the right battery attachment portion 12 may have a pair of (right and left) rail members 12a. Further, the right battery attachment portion 12 may have positive and negative power terminals 12b and 12c that are disposed between the right and left rail members 12a.

Each of the battery packs 13 may preferably be a lithium-ion battery pack that is composed of a hexahedral battery case and a plurality of lithium-ion cells contained in the battery case. Further, each of the battery packs 13 may have a sliding attachment structure. That is, the battery packs 13 may be configured to be attached to the battery attachment portions 11 and 12 by vertically sliding the battery packs 13 downward relative to the battery attachment portions 11 and 12. As best shown in FIG. 5, each of the battery packs 13 may be attached to each of the battery attachment portions 11 and 12 and locked via a locking mechanism (not shown) in a condition in which one surface (battery attachment surface) of the hexahedral battery case thereof is fitted to each of the battery attachment portions 11 and 12 while remaining five surfaces of the hexahedral battery case are circumferentially opened or exposed.

The battery packs 13 may respectively have unlocking buttons 13a. Therefore, the battery packs 13 may be removed from the battery attachment portions 11 and 12 by vertically sliding the battery packs 13 upward relative to the battery attachment portions 11 and 12 in a condition in which the unlocking buttons 13a are pressed down. As will be appreciated, the battery packs 13 may be repeatedly used by recharging using a battery charger. Further, versatile battery packs capable of being applied to another electrical power tool, e.g., a screw tightening device, may be used as the battery packs 13. Preferably, each of the battery packs 13 may have an output voltage of 18V such that the disk grinder 1 can be driven by a rated voltage of 36V (18V×18V).

The battery attachment member 10 may have an overhanging member having right and left overhanging elements 20. The overhanging elements 20 may respectively be configured to extend backward from the battery attachment member 10 while bulging laterally (rightward and leftward) relative to the battery packs 13 attached to battery attachment member 10. In particular, the battery attachment member 10 may have a battery guard member 21 attached thereto. The battery guard member 21 may have right and left substantial portions or guard portions that substantially function to protect the battery packs 13 attached to the battery attachment portions 11 and 12. That is, the right and left guard portions of the battery guard member 21 attached to the battery attachment member 10 may be referred to as the overhanging elements 20 of the overhanging member formed in the battery attachment member 10.

The battery guard member 21 may preferably be made of a single steel rod that is bent into a three-dimensional wire frame structure. In particular, as shown in FIGS. 1, 2 and 4, the battery guard member 21 may include a lower transverse connecting portion 21a that horizontally extends along and connected to a lower surface (one surface) of the battery attachment member 10, left and right lower longitudinal portions 21b and 21c that respectively horizontally extend obliquely backward from left and right ends of the lower transverse connecting portion 21a, left and right upright portions 21d and 21e that respectively vertically extend upward from rear ends of the left and right lower longitudinal portions 21b and 21c while slightly inclining obliquely backward, left and right upper longitudinal portions 21f and 21g that respectively horizontally extend forward from upper ends of the left and right upright portions 21d and 21e, and left and right upper (lateral) terminal end portions 21h and 21i that respectively orthogonally oppositely extend inward from front ends of the left and right upper longitudinal portions 21f and 21g over an upper surface (the other surface) of the battery attachment member 10. Further, in the battery guard member 21 thus constructed, the portions except for the lower transverse connecting portion 21a may correspond to the right and left guard portions of the battery guard member 21. Thus, the right and left guard portions of the battery guard member 21 may substantially extend between the lower and upper surfaces of the battery attachment member 10 while extending backward and bulging laterally. That is, the right and left guard portions of the battery guard member 21 may be laterally oppositely positioned across the battery packs 13 attached to the battery attachment member 10 (FIGS. 3 and 4).

As shown in FIG. 4, the lower transverse connecting portion 21a may preferably be connected to the lower surface of the battery attachment member 10 via an attachment plate 22. In particular, the attachment plate 22 may be integrated with the lower transverse connecting portion 21a by welding. The attachment plate 22 may be screwed on the lower surface of the battery attachment member 10, so that the lower transverse connecting portion 21a may be connected to the lower surface of the battery attachment member 10.

As shown in FIG. 4, the left and right lower longitudinal portions 21b and 21c may respectively extend obliquely backward and outward from around left and right ends of the lower surface of the battery attachment member 10, so as to be gradually spaced away from each other from before backward. In particular, as shown in FIG. 4, the left and right lower longitudinal portions 21b and 21c may respectively spread outward such that rear ends thereof may be positioned outward and backward relative to the right and left battery packs 13 attached to the battery attachment member 10 in a bottom view. That is, the left and right lower longitudinal portions 21b and 21c may respectively extend obliquely backward relative to the right and left battery packs 13 attached to the battery attachment member 10. Further, as shown in FIG. 2, the left and right lower longitudinal portions 21b and 21c may respectively arranged so as to be positioned below the battery packs 13 attached to the battery attachment member 10 in a lateral view.

Because the left and right lower longitudinal portions 21b and 21c may be positioned described above, the left and right upright portions 21d and 21e may respectively positioned in areas that are spaced laterally (leftward and rightward) and backward relative to the battery packs 13 attached to the battery attachment member 10 (FIGS. 1 and 2). That is, the left and right lower upright portions 21d and 21e may respectively positioned obliquely behind the battery packs 13 attached to the battery attachment member 10. As shown in FIGS. 1 and 2, the left and right upright portions 21d and 21e may respectively extend obliquely backward from the rear ends of the left and right lower longitudinal portions 21b and 21c. Therefore, the right and left guard portions of the battery guard member 21 (i.e., the overhanging elements 20 of the battery attachment member 10) may be prevented from guard as supporting legs to stand the disk grinder 1 straight up.

As shown in FIG. 2, the left and right upper longitudinal portions 21f and 21g may respectively arranged so as to be positioned above the battery packs 13 attached to the battery attachment member 10. Further, as shown in FIGS. 3 and 4, the left and right upper longitudinal portions 21f and 21g may respectively positioned in areas that are spaced laterally relative to the battery packs 13 attached to the battery attachment member 10.

As shown in FIG. 2, similar to the left and right upper longitudinal portions 21f and 21g, the left and right upper terminal end portions 21h and 21i may respectively be arranged so as to be positioned above the battery packs 13 attached to the battery attachment member 10. As shown in FIGS. 1, 3 and 5, the left and right upper terminal end portions 21h and 21i may respectively have resin caps 21ha and 21ia that are attached to free ends thereof. Further, as best shown in FIG. 1, the left and right upper terminal end portions 21h and 21i may respectively be positioned above left and right receiving members 23 and 24 that are attached to the upper surface of the battery attachment member 10. In other words, the left and right upper terminal end portions 21h and 21i may substantially be positioned spaced away from the left and right receiving members 23 and 24. Further, this condition, i.e., a condition in which the left and right upper terminal end portions 21h and 21i may respectively be positioned above the left and right receiving members 23 and 24, may be referred to as a normal condition of the right and left guard portions of the battery guard member 21 (i.e., the overhanging elements 20 of the battery attachment member 10).

The battery guard member 21 thus constructed may have elasticity essentially in a direction in which the left and right upper terminal end portions 21h and 21i are laterally spaced away from each other and a direction in which the left and right upper terminal end portions 21h and 21i are upwardly spaced away from the left and right receiving members 23 and 24. As will be appreciated, FIG. 1 shows the normal condition of the overhanging elements 20 (the right and left guard portions of the battery guard member 21) in which an elastic force is not exerted (i.e., an external force is not applied thereto). Further, as described above, in this embodiment, the left and right upper terminal end portions 21h and 21i may respectively be suspended away from the left and right receiving members 23 and 24. However, the left and right upper terminal end portions 21h and 21i may respectively arranged so as to contact the left and right receiving members 23 and 24

As shown in FIGS. 1 and 3, the left receiving member 23 attached to the battery attachment member 10 may have a front (vertical) wall portion 23a and a side (vertical) wall portion 23b. Similarly, the right receiving member 24 attached to the battery attachment member 10 may have a front (vertical) wall portion 24a and a side (vertical) wall portion 24b. The front wall portions 23a and 24a of the left and right receiving members 23 and 24 may respectively function to prevent the left and right upper terminal end portions 21h and 21i from excessively moving or displacing forward. Further, the side wall portion 23b of the left receiving member 23 may function to prevent the left upper terminal end portion 21h from excessively moving or displacing rightward. Conversely, the side wall portion 24b of the right receiving member 24 may function to prevent the right upper terminal end portion 21i from excessively moving or displacing leftward.

When the battery guard member 21 is subjected to the external force due to an accidental drop of the disk grinder 1 on a floor, the right and left guard portions of the battery guard member 21 may be elastically deformed, so that an impact caused by the drop of the disk grinder 1 is effectively absorbed. Further, at this time, the left and right upper terminal end portions 21h and 21i may selectively contact the front wall portions 23a and 24a of the left and right receiving members 23 and 24, so as to be prevented from excessively moving or displacing forward. Also, the left and right upper terminal end portions 21h and 21i may selectively contact the side wall portions 23b and 24b of the left and right receiving members 23 and 24, so as to be prevented from excessively laterally moving or displacing. Further, the right and left guard portions of the battery guard member 21 may be manually reshaped or restored, so as to move or reposition the left and right upper terminal end portions 21h and 21i on the left and right receiving members 23 and 24.

As shown in FIGS. 1 and 3, the battery attachment member 10 may have a laterally elongated air inlet port 14 formed in the upper surface thereof. Conversely, the tool main body 2 may have a cooling fun (not shown) that is connected to the output axis (the motor-axis J) of the electric motor 2b. Upon activation of the electric motor 2b, the cooling fun may be rotated via the motor-axis J, so as to introduce air into the battery attachment member 10 via the air inlet port 14. The air introduced into the battery attachment member 10 may flow into the motor housing 2a and further flow forward therethrough. As shown in FIG. 3, the battery attachment member 10 may have a controller 15 received therein. The controller 15 may function to control movement of the electric motor 2b. The controller 15 may be cooled by the air introduced into the battery attachment member 10. Further, the electric motor 2b may be cooled by the air flowing through the motor housing 2a. As shown in FIGS. 1 and 3, the left and right receiving members 23 and 24 may preferably be positioned laterally adjacent to the air inlet port 14.

As described above, in the disk grinder 1 thus constructed, the battery attachment member 10 may have the right and left overhanging elements 20. Further, the right and left overhanging elements 20 may be formed by the right and left guard portions of the battery guard member 21 that are laterally oppositely positioned across the battery packs 13 attached to the battery attachment member 10. The right and left overhanging elements 20 thus formed may effectively protect the battery packs 13 from the impact.

In particular, as shown in FIGS. 2 and 3, the right and left guard portions of the battery guard member 21 (the right and left overhanging elements 20) may extend backward from the battery attachment member 10 in the areas that are spaced laterally relative to the battery packs 13 attached to the battery attachment member 10. Further, the right and left guard portions of the battery guard member 21 may extend along or hang over lateral (right and left) sides of the battery packs 13 attached to the battery attachment member 10 over a substantial amount of extension (overhang) while laterally (rightward and leftward) extending or bulging relative to the battery packs 13. Further, the right and left guard portions of the battery guard member 21 may respectively be laterally positioned along the lateral sides of the battery packs 13 and may have an amount of extension greater than the battery packs 13 (i.e., a profile of the battery packs 13) in the lateral view. Therefore, when the disk grinder 1 is accidentally dropped on the floor, the right and left guard portions of the battery guard member 21 may contact the floor, so that the battery packs 13 may be prevented from contacting the floor. As a result, the battery packs 13 may be prevented from being directly subjected to the impact caused by the drop of the disk grinder 1, so as to be effectively protected. Thus, the right and left guard portions of the battery guard member 21 may exert a battery pack protection function against the impact (which may be referred to as a main function). Also, such an impact on the battery packs 13 may be dampened or absorbed due to elasticity or cushioning properties of the right and left guard portions of the battery guard member 21, so that the battery pack protection function against the impact may be increased.

Further, the right and left guard portions of the battery guard member 21 (the right and left overhanging elements 20) may have a disk grinder stabilization function (which may be referred to as an auxiliary function) in a laid condition of the disk grinder 1 (FIG. 1). As described above, the overhanging elements 20 may be laterally positioned relative to (i.e., positioned on both sides of) the battery packs 13 attached to the battery attachment member 10. Further, the overhanging elements 20 may be extended vertically (upward and downward) beyond the battery packs 13 in the lateral view. Therefore, when the disk grinder 1 is horizontally put or laid on a working bench (not shown), the overhanging elements 20 may contact the working bench. As a result, the disk grinder 1 may be horizontally put on the working bench in a highly stable condition.

As described above, the overhanging elements 20 having the three-dimensional wire frame structure may have the moderate elasticity or cushioning properties. Therefore, the overhanging elements 20 may be used as a support member when the disk grinder 1 is used. That is, the overhanging elements 20 may have a disk grinder support function (which may be referred to as an auxiliary function) when the disk grinder 1 is used. In particular, a user may handle the disk grinder 1 with the overhanging elements 20 pressed against the waist. Therefore, the disk grinder 1 may be held in an adequate position or angle in use. This may lead to increased usability of the disk grinder 1.

Further, the right and left guard portions of the battery guard member 21 may be connected each other only by the lower transverse connecting portion 21a. Therefore, the right and left guard portions of the battery guard member 21 (the right and left overhanging elements 20) may substantially be separately positioned on both (right and left) sides of the battery attachment member 10, so as to be laterally oppositely positioned across the battery packs 13 attached to the battery attachment member 10 (FIG. 3). That is, the right and left guard portions of the battery guard member 21 may be fully opened backward and upward relative to the battery attachment member 10 (the battery packs 13 attached thereto). As a result, when the battery packs 13 are attached to and removed from the left and right battery attachment portions 11 and 12 of the battery attachment member 10, the battery packs 13 may be prevented from interfering with the right and left guard portions of the battery guard member 21. Therefore, the battery packs 13 may be smoothly attached to and removed from the battery attachment member 10.

As described above, the battery guard member 21 may have the three-dimensional wire frame structure that is made of the bent steel rod. Therefore, the disk grinder 1 may be prevented from excessively increasing in weight.

Further, the right and left guard portions of the battery guard member 21 may be manually bent to change in shape. Therefore, at least one of the left and right upper terminal end portions 21h and 21i of the battery guard member 21 may be temporarily displaced from the left and right receiving members 23 and 24. The battery guard member 21 of which the at least one of the left and right upper terminal end portions 21h and 21i is displaced from the left and right receiving members 23 and 24 may be used as a hook (which may be referred to as an auxiliary function). Further, the right and left guard portions of the battery guard member 21 may be used as a hanger for a coiled cable or other such cable.

The battery guard member 21 may be attached to the disk grinder 1 in such a way that the right and left guard portions thereof are positioned on both sides of the battery attachment member 10. Therefore, the battery guard member 21 may be easily attached to the disk grinder 1. Further, the battery guard member 21 may have the three-dimensional wire frame structure. Therefore, the right and left guard portions of the battery guard member 21 may be used as a handle in order to carry the disk grinder 1. In particular, the user may carry the disk grinder 1 while grasping the left and right upright portions 21d and 21e of the battery guard member 21.

Generally, the disk grinder 1 may be used in a condition in which the grip portion 2c is grasped by the user. Further, the disk grinder 1 may be used in various positions or angles, e.g., a first grasping position in which the spindle 3b is directed downward, a second grasping position in which the spindle 3b is directed rightward, and a third grasping position in which the spindle 3b is directed leftward. As will be recognized, the right and left guard portions of the battery guard member 21 (the right and left overhanging elements 20) may respectively be extended and bulged to the extent that the user's hand grasping the grip portion 2c does not interfere therewith even in any of the first to third positions of the disk grinder 1. Therefore, the right and left guard portions of the battery guard member 21 do not reduce operability of the disk grinder 1.

Various changes and modifications may be made to the present disclosure without departing from the scope of the previously shown and described embodiment. For example, in the embodiment, the disk grinder 1 having the two battery packs 13 is shown. However, the disk grinder 1 may be modified to have a single battery pack or three or more battery packs. Naturally, the output voltage of each of the battery packs 13 is not limited to 18V.

Further, in the embodiment, the left and right upper terminal end portions 21h and 21i are positioned spaced away from the left and right receiving members 23 and 24 in the normal condition of the right and left guard portions of the battery guard member 21. However, the battery guard member 21 may be configured such that the left and right upper terminal end portions 21h and 21i may respectively be pressed against or hooked on the left and right receiving members 23 and 24 in the normal condition of the right and left guard portions of the battery guard member 21. Further, the battery guard member 21 may be configured such that the left and right upper terminal end portions 21h and 21i are respectively detachably connected to the left and right receiving members 23 and 24. Alternatively, the battery guard member 21 may be configured such that the left and right upper terminal end portions 21h and 21i are respectively connected to the battery attachment member 10. Further, the battery guard member 21 may be configured to be detachably connected to the upper and lower surfaces of the battery attachment member 10 by a snap-fit engagement or elastically pinching engagement. The battery guard member 21 thus modified may be attached to and removed from the battery attachment member 10 as necessary.

Further, in this embodiment, the battery guard member 21 has the right and left guard portions that are respectively laterally positioned along the battery packs 13. That is, the overhanging member formed in the battery attachment member 10 is configured such that the right and left overhanging elements 20 are respectively laterally positioned along the lateral sides of the battery packs 13 attached to the battery attachment member 10. However, the battery guard member 21 may be configured such that one of the right and left guard portions is laterally positioned along one of the lateral sides of the battery packs 13. That is, the overhanging member may be configured such that one of the right and left overhanging elements 20 substantially extends along one of the lateral sides of the battery packs 13. Alternatively, the overhanging member may be configured to have a single overhanging element that extends along one of the lateral sides of the battery packs 13. In addition, the battery guard member 21 may be configured to have upper and lower guard portions that respectively extend along upper and lower sides of the battery packs 13.

In this embodiment, the battery guard member 21 is attached to the battery attachment member 10. However, the battery guard member 21 may be directly attached the battery packs 13 attached to the battery attachment member 10. Further, the battery guard member 21 may be attached to the tool main body 2 instead of the battery attachment member 10.

In this embodiment, each of the right and left guard portions of the battery guard member 21 has the three-dimensional wire frame structure. However, each of the right and left guard portions of the battery guard member 21 may be replaced with a plate shaped member. Further, the battery guard member 21 may be previously magnetized such that various tool bits are magnetically attached thereto.

Further, in the embodiment, the disk grinder 1 is exemplified as the electrical devices. However, the electrical devices may include electrical power tools (e.g., an electrical drill, an electrical screwdriver and an electrical cutting device), home appliances (e.g., a cordless electrical cleaner and a lighting device), acoustic instruments (e.g., a radio and a speaker), cooking appliances (e.g., a coffee maker and a mixer) and gardening instruments (e.g., a lawn mower and a grass trimmer) that are configured such that the battery packs 13 as the power source are attached thereto without covering.

A representative example of the present disclosure has been described in detail with reference to the attached drawings. This detailed description is merely intended to teach a person of skill in the art further details for practicing preferred aspects of the present disclosure and is not intended to limit the scope of the disclosure. Only the claims define the scope of the claimed disclosure. Therefore, combinations of features and steps disclosed in the foregoing detailed description may not be necessary to practice the disclosure in the broadest sense, and are instead taught merely to particularly describe detailed representative examples of the disclosure. Moreover, the various features taught in this specification may be combined in ways that are not specifically enumerated in order to obtain additional useful embodiments of the present disclosure.

What is claimed is:

1. An electrical power tool comprising:
an elongated tool main body that (1) contains an electric motor, (2) has a longitudinal axis in a forward-backward direction and (3) includes (a) a front portion in the forward-backward direction that is configured to have a tip tool attached to the front portion and (b) a battery attachment member at a rear portion in the forward-backward direction;
a battery pack attached to the battery attachment member; and
overhanging elements positioned on both sides of the battery pack in a first lateral direction that is orthogonal to the forward-backward direction; wherein:
the overhanging elements include (1) a first portion that is fixedly attached to the tool main body, (2) an end portion that (a) is not connected to the tool main body and (b) is configured to not contact the tool main body unless a predetermined load is applied to the overhanging elements, and (3) a loop portion that (a) connects the first portion and the end portion and (b) is spaced from the tool main body and the battery pack;
the battery pack has a back surface in the forward-backward direction; and
the overhanging elements do not overlap the back surface in the forward-backward direction.

2. An electrical power tool comprising:
an elongated tool main body that (1) contains an electric motor, (2) has a longitudinal axis in a forward-backward direction and (3) includes (a) a front portion in the forward-backward direction that is configured to have a tip tool attached to the front portion and (b) a battery attachment member at a rear portion in the forward-backward direction;
a battery pack attached to the battery attachment member; and
overhanging elements positioned on both sides of the battery pack in a first lateral direction that is orthogonal to the forward-backward direction; wherein:
the overhanging elements include (1) a first portion that is fixedly attached to the tool main body, (2) an end portion that (a) is not connected to the tool main body and (b) is configured to not contact the tool main body unless a predetermined load is applied to the overhanging elements, and (3) a loop portion that (a) connects the first portion and the end portion and (b) is spaced from the tool main body and the battery pack;
the battery attachment member is configured such that two battery packs are attached thereto side-by-side;
the overhanging elements are positioned along the sides of the two battery packs that are not facing each other; and
the overhanging elements and the battery packs are configured such that the overhanging elements do not overlap the battery packs in a second lateral direction that is orthogonal to the forward-backward direction and the first lateral direction.

3. The electrical device as described in claim 2, wherein the battery attachment member is configured such that the two battery packs are attached thereto while being laterally juxtaposed to each other.

4. The electrical power tool as described in claim 2, wherein the overhanging elements and the battery packs are configured such that the overhanging elements do not substantially overlap the battery packs in the first lateral direction.

5. An electrical power tool comprising:
- an elongated tool main body that (1) contains an electric motor, (2) has a longitudinal axis in a forward-backward direction and (3) includes (a) a front portion in the forward-backward direction that is configured to have a tip tool attached to the front portion and (b) a battery attachment member at a rear portion in the forward-backward direction;
- a battery pack attached to the battery attachment member; and
- overhanging elements positioned on both sides of the battery pack in a first lateral direction that is orthogonal to the forward-backward direction; wherein:
- the overhanging elements include (1) a first portion that is fixedly attached to the tool main body, (2) an end portion that (a) is not connected to the tool main body and (b) is configured to not contact the tool main body unless a predetermined load is applied to the overhanging elements, and (3) a loop portion that (a) connects the first portion and the end portion and (b) is spaced from the tool main body and the battery pack;
- the loop portion of each of the overhanging elements includes (1) a lower longitudinal portion extending backward from the first portion in the forward-backward direction, (2) an upright portion extending from a rear end of the lower longitudinal portion in a second lateral direction that is orthogonal to the forward-backward direction and the first lateral direction, and (3) an upper longitudinal portion extending forward in the forward-backward direction from a second end of the upright portion that is opposite to a first end of the upright portion that is continuous with the rear end of the lower longitudinal portion; and
- the end portion is at a second end of the upper longitudinal portion that is opposite to a first end of the upper longitudinal portion that is continuous with the upright portion.

6. The electrical power tool as described in claim 5, wherein the overhanging elements are configured to function as a battery guard member to protect the battery pack from an impact.

7. The electrical power tool as described in claim 5, wherein the overhanging elements are spaced in the first lateral direction.

8. The electrical power tool as described in claim 5, wherein the overhanging elements have a wire frame structure.

9. The electrical power tool as described in claim 5, wherein the overhanging elements are configured such that the end portion is elastically pressed against the battery attachment member when the predetermined load is applied to the overhanging elements.

10. The electrical device as described in claim 5, further comprising a pair of receiving members that are attached to the tool main body,
wherein each of the pair of receiving members is configured to receive the end portion of one of the overhanging elements when the predetermined load is applied to the overhanging elements.

11. The electrical device as described in claim 5, wherein the each of the overhanging elements is configured such that the lower longitudinal portion does not substantially overlap the battery pack in the first lateral direction.

12. The electrical device as described in claim 5, wherein the each of the overhanging elements is configured such that the upper longitudinal portion does not substantially overlap the battery pack in the first lateral direction.

13. The electrical device as described in claim 5, wherein the each of the overhanging elements is configured such that the upright portion is positioned behind the battery packs in the forward-rear direction when viewed from the first lateral direction.

14. The electrical device as described in claim 5, wherein:
the lower longitudinal portions of the overhanging elements are a continuous member; and
the end portions of the overhanging elements are spaced away from each other in the first lateral direction of the tool main body.

15. The electrical power tool as described in claim 5, wherein the end portions have resin caps attached thereto.

* * * * *